(12) United States Patent
Uimonen et al.

(10) Patent No.: US 11,186,335 B1
(45) Date of Patent: Nov. 30, 2021

(54) BICYCLE AND SUPPORTING FRAME THEREOF

(71) Applicant: MOBILITY HOLDINGS, LIMITED, Causeway Bay (HK)

(72) Inventors: Joakim Uimonen, Causeway Bay (HK); Antoine Goudrand, Causeway Bay (HK); Chao-Liang Hsu, Causeway Bay (HK)

(73) Assignee: MOBILITY HOLDINGS, LIMITED, Causeway Bay (HK)

(*) Notice: Subject to any disclaimer, the term of this patent is extended or adjusted under 35 U.S.C. 154(b) by 0 days.

(21) Appl. No.: 16/987,039

(22) Filed: Aug. 6, 2020

(51) Int. Cl.
*B62H 1/04* (2006.01)

(52) U.S. Cl.
CPC ........... *B62H 1/04* (2013.01); *B62H 2700/00* (2013.01)

(58) Field of Classification Search
CPC ........ B62H 1/04; B62H 2700/00; B62H 1/08; B62H 3/00; B62H 3/10; B62H 1/02; B62H 3/04; B62H 1/06; B62H 1/00; B62H 1/10
USPC ............. 280/293, 288.4, 295, 298, 299–304; 211/17, 22, 21
See application file for complete search history.

(56) References Cited

U.S. PATENT DOCUMENTS

| | | | | |
|---|---|---|---|---|
| 619,103 A * | 2/1899 | Vander Weyde | ........ | B62H 1/02 280/303 |
| 640,614 A * | 1/1900 | Booth | ...................... | B62H 1/02 280/303 |
| 640,784 A * | 1/1900 | Lowe | ...................... | B62H 1/06 280/300 |
| 1,054,237 A * | 2/1913 | Phelan | ..................... | B62H 1/00 280/302 |
| 1,068,964 A * | 7/1913 | Blair et al. | ............... | B62H 1/00 280/299 |
| 1,168,955 A * | 1/1916 | Navarrete | ................ | B62H 1/00 280/302 |
| 1,172,465 A * | 2/1916 | Knapp | ..................... | B62H 1/00 280/302 |
| 1,254,624 A * | 1/1918 | Betts et al. | .............. | B62H 1/00 280/299 |

(Continued)

FOREIGN PATENT DOCUMENTS

| | | |
|---|---|---|
| CN | 201901189 U | 7/2011 |
| CN | 203511887 U | 4/2014 |

(Continued)

*Primary Examiner* — Jennifer E. Novosad
(74) *Attorney, Agent, or Firm* — Muncy, Geissler, Olds & Lowe, P.C.

(57) ABSTRACT

A supporting frame is applied on a bicycle. The bicycle includes a main frame. In relation to the bicycle, the supporting frame has a supporting state and a folded state. The supporting frame includes a connector, a front supporting frame assembly, two connecting bars and two rear supporting frames. The connector is located on the main frame. The front supporting frame assembly includes two first pivotal connecting portions and two second pivotal connecting portions. The front supporting frame assembly is pivotally connected to the connector via the two first pivotal connecting portions. The two connecting bars both include a first connecting end and a second connecting end opposite the first connecting end. The two first connecting ends are respectively and pivotally connected to the two second pivotal connecting portions.

20 Claims, 11 Drawing Sheets

(56) References Cited

U.S. PATENT DOCUMENTS

| | | | | |
|---|---|---|---|---|
| 2,972,478 | A * | 2/1961 | Raines | A63B 69/16 482/61 |
| 3,039,792 | A * | 6/1962 | Wood | B62H 1/02 280/302 |
| 4,420,164 | A * | 12/1983 | Mitchell | B62H 3/00 248/352 |
| 4,443,024 | A * | 4/1984 | Okai | B62H 1/06 280/304 |
| 5,118,126 | A * | 6/1992 | Yaple | B62H 1/02 280/293 |
| 5,234,225 | A * | 8/1993 | Yaple | B62H 1/04 280/293 |
| 6,050,546 | A * | 4/2000 | Peschmann | B66F 5/025 254/1 OB |
| 6,199,888 | B1 * | 3/2001 | Ito | B62H 1/04 280/303 |
| 6,217,051 | B1 * | 4/2001 | Nakagawa | B62H 1/04 280/303 |
| 6,241,227 | B1 * | 6/2001 | Berdan | B62B 3/108 254/1 OR |
| 6,464,207 | B2 * | 10/2002 | Creel | B25H 1/0014 254/1 OC |
| 6,619,620 | B1 * | 9/2003 | Carter | B66F 7/08 254/1 OC |
| 7,103,995 | B2 * | 9/2006 | Curtis | E01H 1/00 172/273 |
| 7,641,213 | B1 * | 1/2010 | Chen | B62H 1/12 280/293 |
| 8,235,419 | B1 * | 8/2012 | Giarrusso | B62H 1/12 280/755 |
| 8,360,252 | B1 * | 1/2013 | Fagan | B62H 3/00 211/21 |
| 8,376,384 | B2 * | 2/2013 | Tsai | B62H 1/12 280/293 |
| 9,434,433 | B1 * | 9/2016 | Cheng | B62H 1/02 |
| 10,618,582 | B1 * | 4/2020 | Liu | B62H 3/04 |
| 10,654,536 | B1 * | 5/2020 | Moreno | B62H 3/00 |
| 2004/0000778 | A1 * | 1/2004 | Ouellette | B62H 1/02 280/763.1 |
| 2005/0199561 | A1 * | 9/2005 | Dansie | B25H 1/0014 211/22 |
| 2005/0275191 | A1 * | 12/2005 | Takahashi | B62H 1/02 280/302 |
| 2006/0061061 | A1 * | 3/2006 | Chuang | B62H 1/06 280/293 |
| 2008/0174088 | A1 * | 7/2008 | Kobacker | B62H 3/04 280/293 |
| 2010/0283222 | A1 * | 11/2010 | Lin | B62H 1/04 280/303 |
| 2011/0316252 | A1 * | 12/2011 | Cheng | B62H 1/00 280/294 |
| 2012/0133116 | A1 * | 5/2012 | Yun | B62J 27/00 280/755 |
| 2012/0139221 | A1 * | 6/2012 | Lo | B62H 1/04 280/766.1 |
| 2012/0241392 | A1 * | 9/2012 | Combs | B60B 29/001 211/21 |
| 2013/0320649 | A1 * | 12/2013 | Zhu | B62H 1/04 280/302 |
| 2016/0264205 | A1 * | 9/2016 | Ishii | B62K 25/283 |
| 2017/0021885 | A1 * | 1/2017 | Montague | B62H 1/04 |
| 2017/0259862 | A1 * | 9/2017 | Cheng | B62H 1/04 |
| 2019/0144058 | A1 * | 5/2019 | Privitelli | B62H 1/04 280/302 |
| 2020/0239094 | A1 * | 7/2020 | Kaise | B62H 1/02 |

FOREIGN PATENT DOCUMENTS

| | | |
|---|---|---|
| CN | 107117251 A | 9/2017 |
| CN | 208931490 U | 6/2019 |
| DE | 2545251 A1 | 4/1977 |
| KR | 20180022204 A | 3/2018 |

* cited by examiner

BICYCLE AND SUPPORTING FRAME THEREOF

BACKGROUND OF THE INVENTION

1. Field of the Invention

The present invention relates generally to a bicycle and supporting frame thereof, and more particularly to a bicycle and supporting frame thereof, which can park stably and will not fall over easily.

2. Description of the Related Art

An common bicycle is usually provided with a side supporting frame. The side supporting frame is a metal bar pivotally connected on the position of the axle center of the rear wheel. The metal bar can be turned to be supported on the ground, so that the bicycle can stand on the ground. However, if the bicycle is collided by an external force, the metal bar may tilt, causing the bicycle to fall over. For example, as shown in Korea Patent (Patent Number: KR2018002204A) and Chinese Patent (Published Patent Number: CN208931490U), which both disclosed the motorcycle and bike with the supporting frame, and if the motorcycle and bike is collided by an external force, the supporting frame may tilt, causing the motorcycle and bike to fall over.

Therefore, there is a necessity to provide a new supporting frame that can enable stable parking of a bicycle without the risk of falling over easily.

SUMMARY OF THE INVENTION

The main object of the present invention is to provide a supporting frame that can enable stable parking of a bicycle without the risk of falling over easily.

In order to accomplish the above object, the present invention provides a supporting frame applied on a bicycle. A bicycle includes a main frame. Relative to the bicycle, the supporting frame has a supporting state and a folded state. The supporting frame includes a connector, a front supporting frame assembly, two connecting bars and two rear supporting frames. The connector is located on the main frame. The front supporting frame assembly includes two first pivotal connecting portions and two second pivotal connecting portions. The front supporting frame assembly is pivotally connected to the connector through the two first pivotal connecting portions. The two connecting bars both include a first connecting end and a second connecting end opposite the first connecting end. Two first connecting ends are respectively and pivotally connected to two second pivotal connecting portions. Two rear supporting frames both include a third pivotal connecting portion. Two second connecting ends are respectively and pivotally connected to the third pivotal connecting portions of the two rear supporting frames. Based on the above construction, when the front supporting frame assembly is turned in the direction toward the connector, the front supporting frame assembly will push the two connecting bars, so that the two connecting bars will drive the two rear supporting frames to turn along a first direction until the front supporting frame assembly touches the connector, resulting in a folded state of the supporting frame; when the supporting frame assembly is turned in the direction away from the connector, the front supporting frame assembly will push the two connecting bars, so that the two connecting bars will drive the two rear supporting frames to turn along a second direction until the front supporting frame assembly touches the ground, resulting in a supporting state of the supporting frame.

Based on an embodiment of the present invention, when the supporting frame is in a folded state, the two connecting bars are located above the front supporting frame assembly, whereas the two rear supporting frames are located below the two connecting bars.

Based on an embodiment of the present invention, wherein the front supporting frame assembly further includes a pivotal connecting shell, and two first pivotal connecting portions and two second pivotal connecting portions are both located on the pivotal connecting shell.

Based on an embodiment of the present invention, wherein the connector further includes a front supporting frame connecting portion, the front supporting frame connecting portion includes two pivotal connecting surfaces, wherein the two first pivotal connecting portions are respectively and pivotally connected to the two pivotal connecting surfaces.

Based on an embodiment of the present invention, wherein the front supporting frame assembly further includes a supporting main body and two supporting components; the supporting main body is U-shaped, and the closed end of the U shape is connected to a pivotal connecting shell; two supporting components are respectively located on the two open ends of the U shape, and the two supporting components respectively extend in the direction away from the supporting main body.

Based on an embodiment of the present invention, wherein the supporting frame further includes at least one first elastic component, the front supporting frame connecting portion further includes a bottom surface. The two ends of the first elastic component are respectively connected to one of the open ends and the bottom surface, so as to drive the front supporting frame assembly to turn in relation to the front supporting frame connecting portion.

Based on an embodiment of the present invention, wherein the two rear supporting frames both include a connecting end and a supporting end opposite the connecting end, the connector further includes two rear supporting frame connecting portions, wherein the two rear supporting frame connecting portions are respectively connected to the connecting ends of the two rear supporting frames.

Based on an embodiment of the present invention, the supporting frame further includes two second elastic components, the two ends of the two second elastic components are respectively connected to the two connecting ends and two rear supporting frame connecting portions, so as to drive the two rear supporting frames to turn in relation to the two rear supporting frame connecting portions.

Based on an embodiment of the present invention, wherein the bicycle further includes a rear wheel, the main frame further includes two platforms, and the two platforms are respectively located on the two sides of the rear wheel, and the connector is connected to the two platforms.

Based on an embodiment of the present invention, wherein the bicycle further includes a rear wheel; when the supporting frame is in a supporting state, the front supporting frame assembly stands in front of the rear wheel, the two rear supporting frames stands behind the axle center of the rear wheel.

The main object of the present invention is to provide a bicycle that can park stably without the risk of falling over easily.

In order to accomplish the above object, the present invention of a bicycle includes a main frame and a supporting frame. In relation to the bicycle, the supporting frame has a supporting state and a folded state. The supporting frame includes a connector, a front supporting frame assembly, two connecting bars and two rear supporting frames. The connector is located on the main frame. The front supporting frame assembly includes two first pivotal connecting portions and two second pivotal connecting portions. The front supporting frame assembly is pivotally connected to the connector via the two first pivotal connecting portions. The two connecting bars both include a first connecting end and a second connecting end opposite the first connecting end, and the two first connecting ends are respectively and pivotally connected to two second pivotal connecting portions. The two rear supporting frames both include a third pivotal connecting portion. Two second connecting ends are respectively and pivotally connected to the third pivotal connecting portions of the two rear supporting frames. Based on the above construction, when the front supporting frame assembly is turned in the direction toward the connector, the front supporting frame assembly will push the two connecting bars, so that the two connecting bars will drive the two rear supporting frames to turn along a first direction until the front supporting frame assembly touches the connector, resulting in a folded state of the supporting frame; when the supporting frame assembly is turned in the direction away from the connector, the front supporting frame assembly will push the two connecting bars, so that the two connecting bars will drive the two rear supporting frames to turn along a second direction until the front supporting frame assembly touches the ground, resulting in a supporting state of the supporting frame.

DETAILED DESCRIPTION OF THE PREFERRED EMBODIMENT

Figure 1:
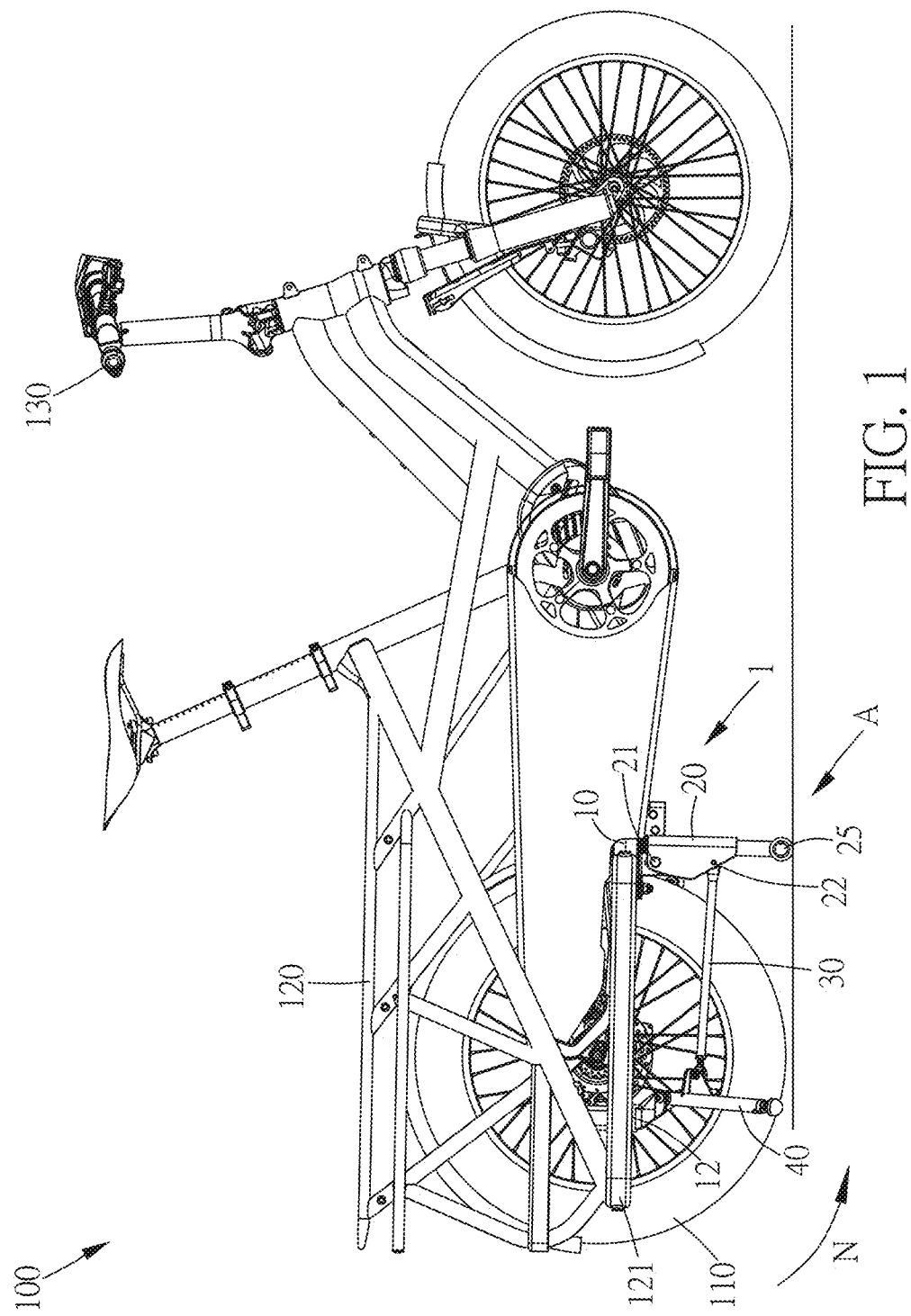
FIG. 1 is a schematic view of an embodiment of the present invention of a bicycle with the supporting frame in a supporting state when the front supporting frame assembly and the front wheel stand on the ground.
Figure 1A:
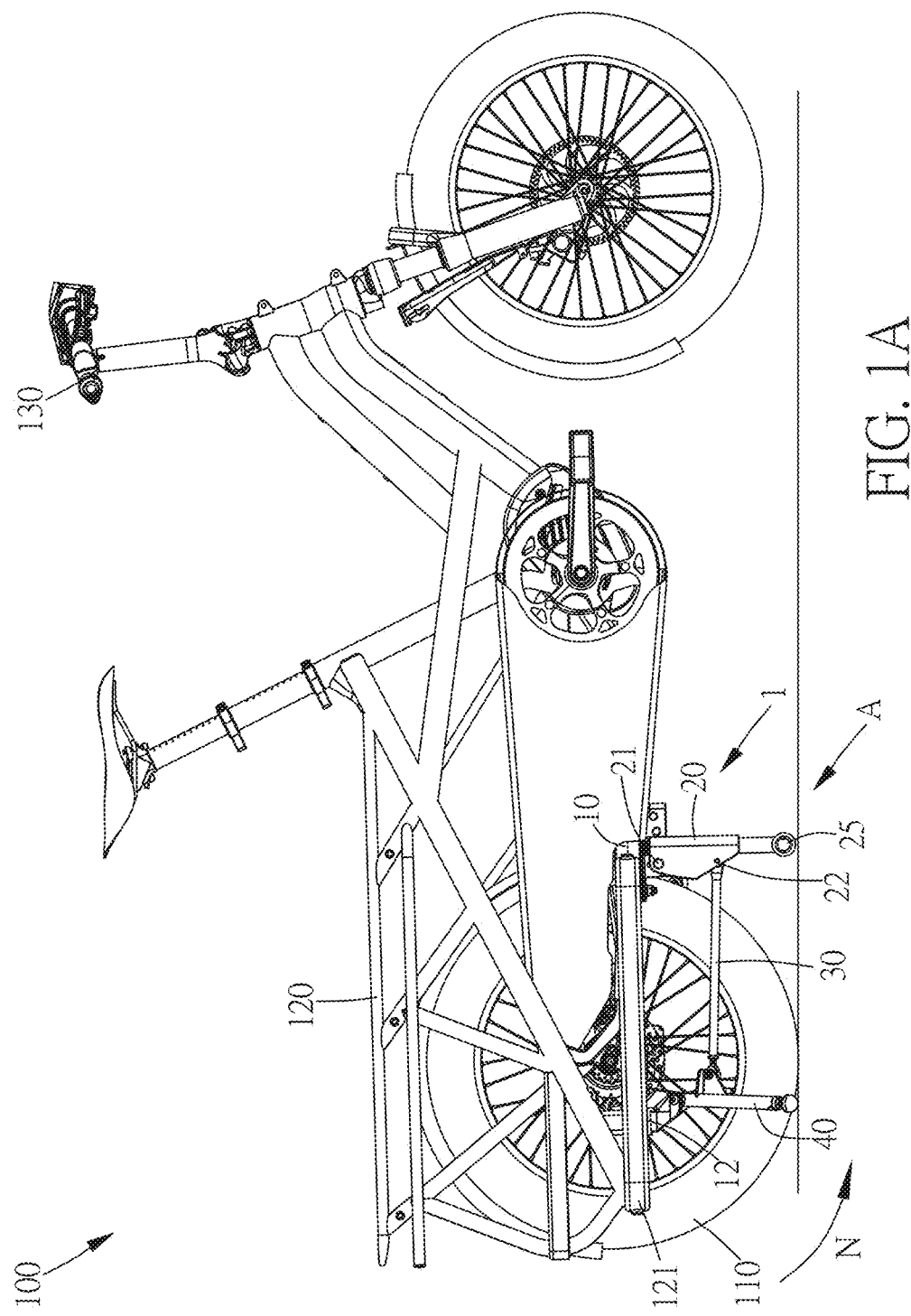
FIG. 1A is a schematic view of an embodiment of the present invention of a bicycle with the supporting frame in a supporting state when the front supporting frame assembly and the two rear supporting frames stand on the ground.
Figure 2:
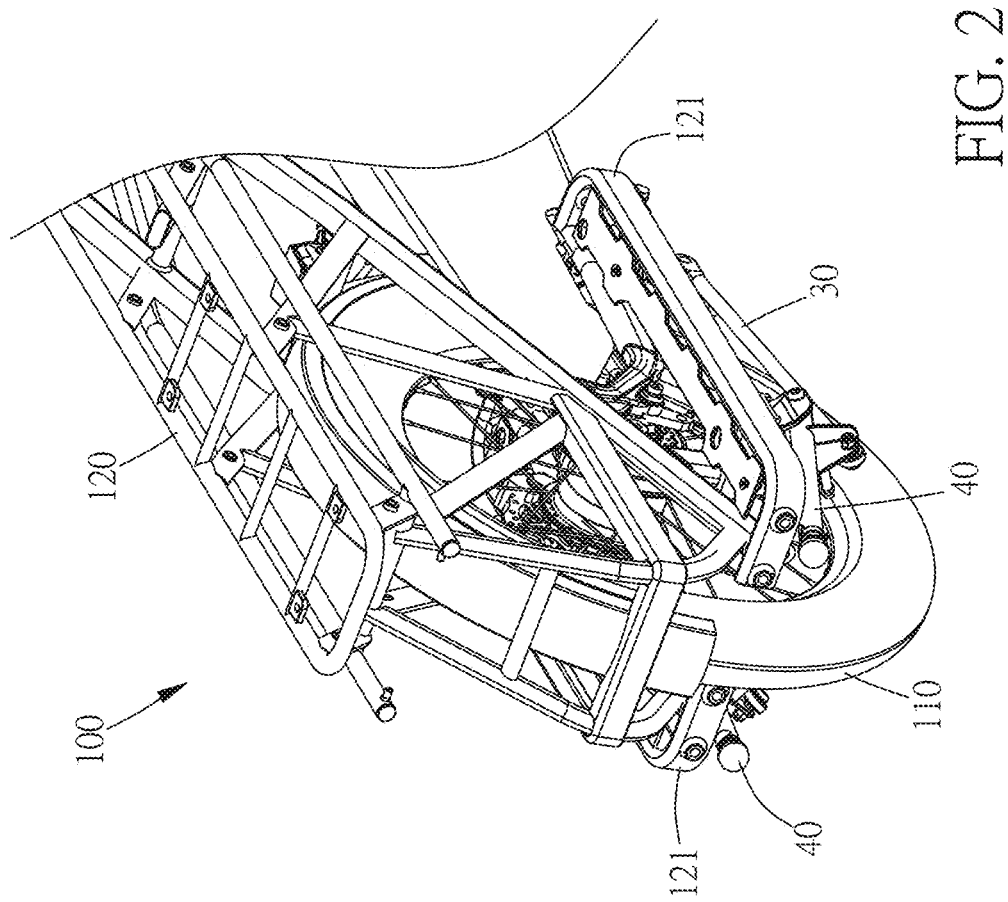
FIG. 2 is a partial schematic view of an embodiment of the present invention of a bicycle with the supporting frame in a supporting state.
Figure 3:
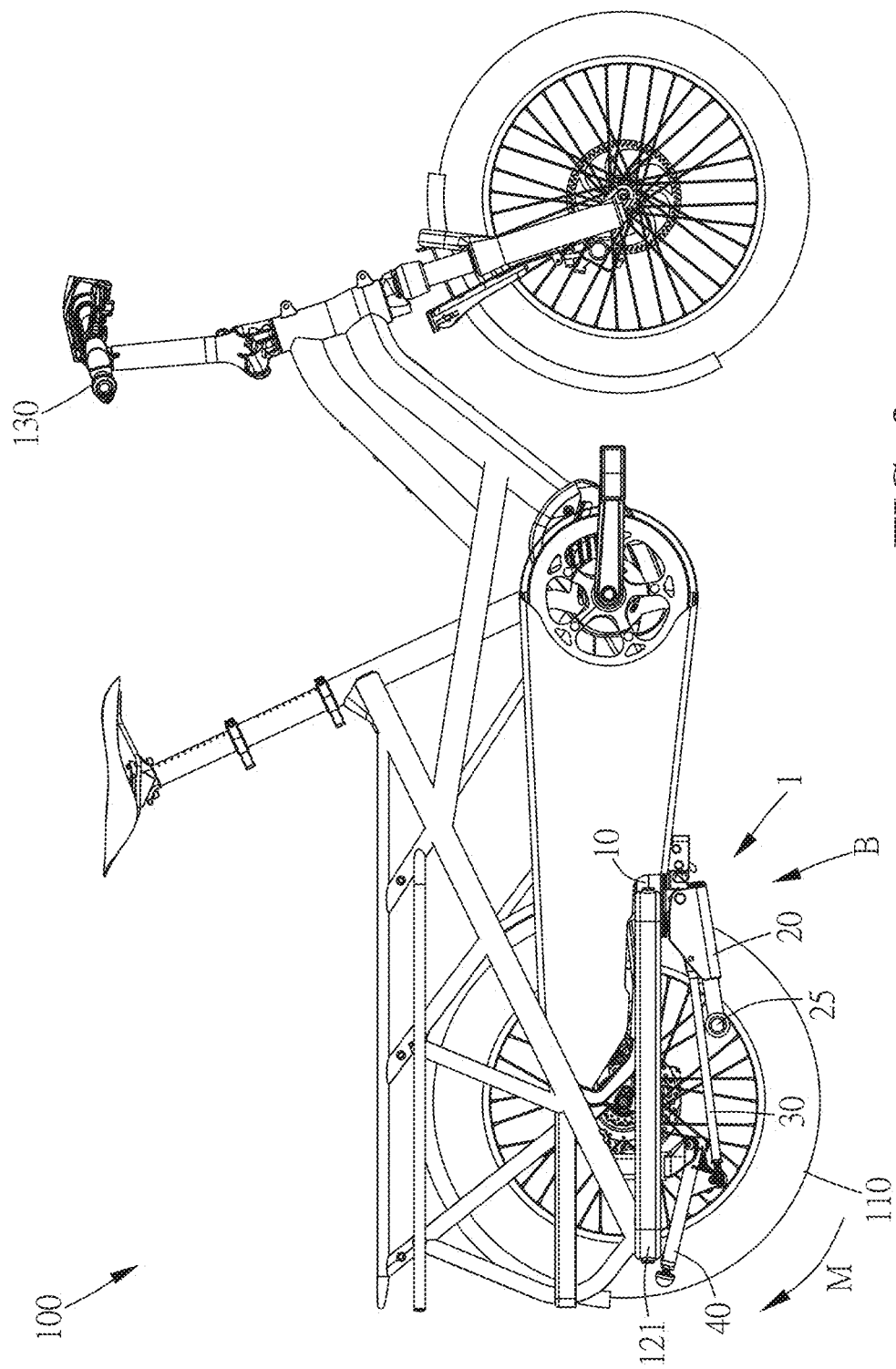
FIG. 3 is a schematic view of an embodiment of the present invention of a bicycle with the supporting frame in a folded state.
Figure 4:
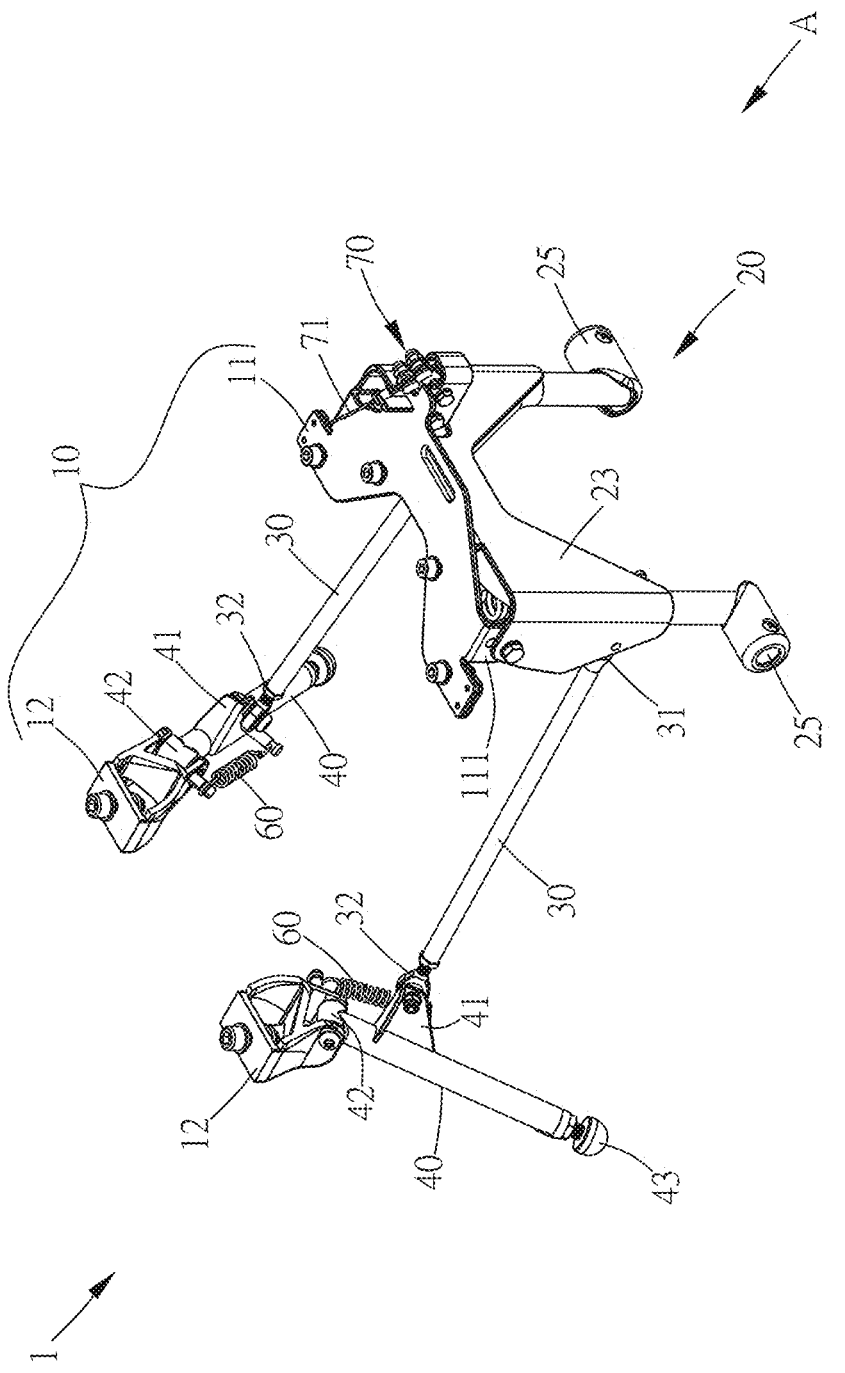
FIG. 4 is a schematic view of an embodiment of the present invention with the supporting frame in a supporting state.
Figure 5:
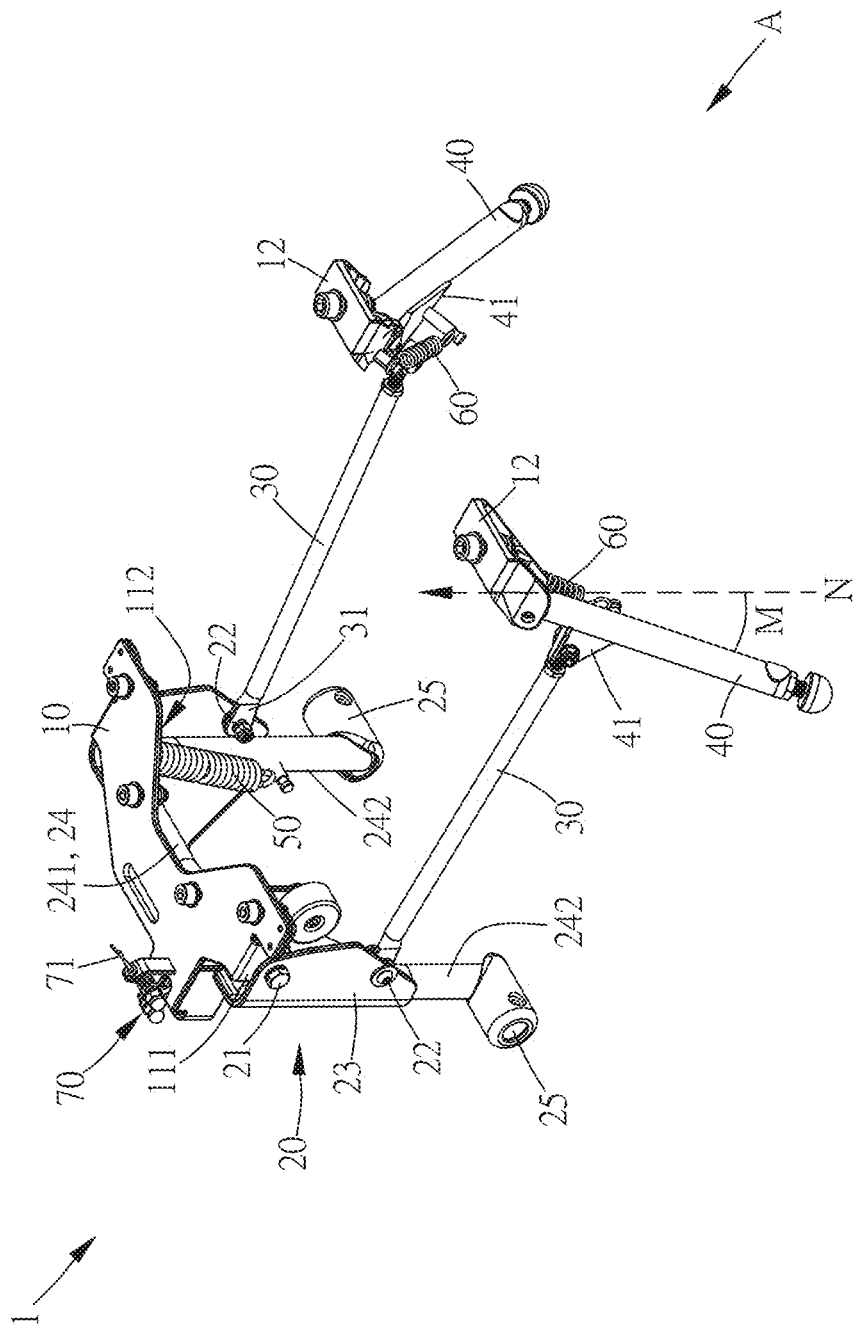
FIG. 5 is a schematic view from another angle of an embodiment of the present invention with the supporting frame in a supporting state.
Figure 6:
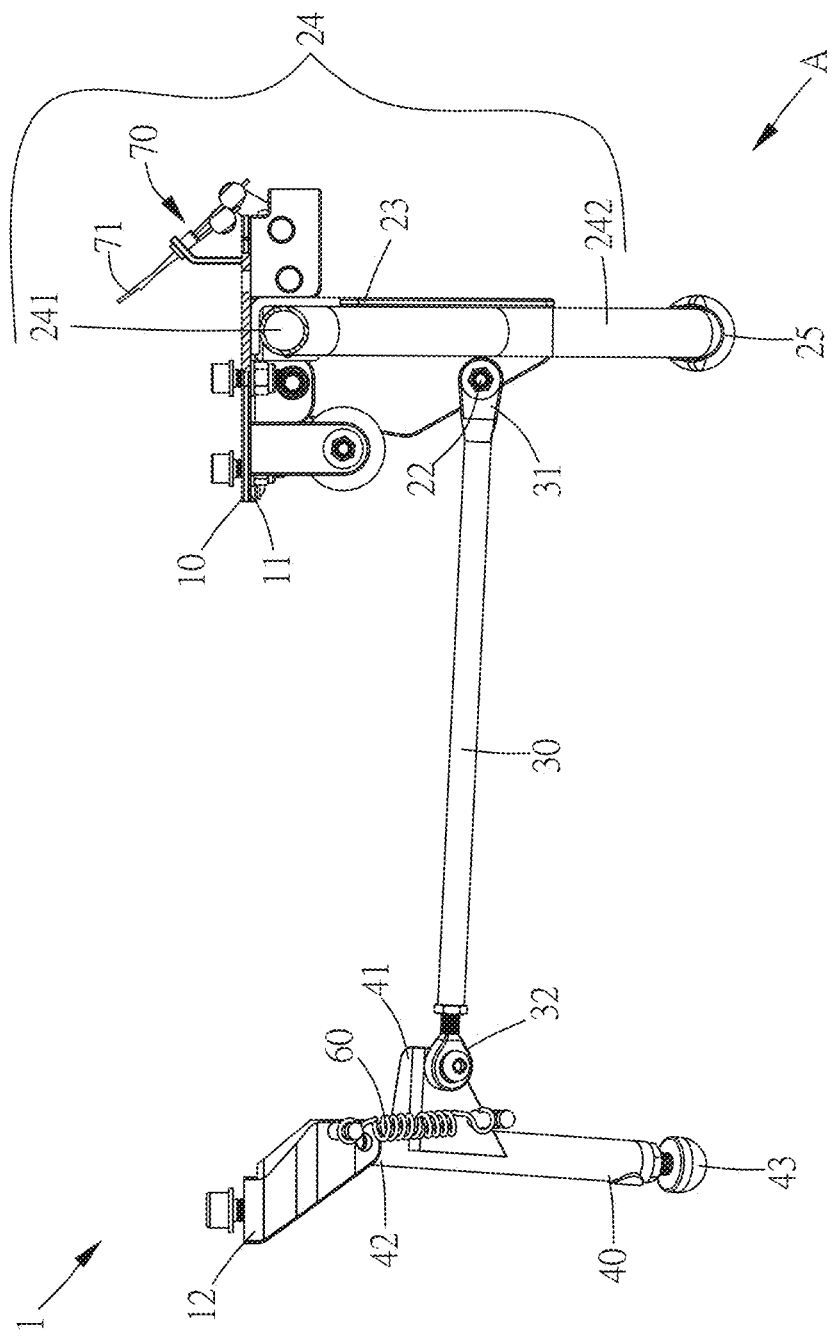
FIG. 6 is a side view of an embodiment of the present invention with the supporting frame in a supporting state.
Figure 7:
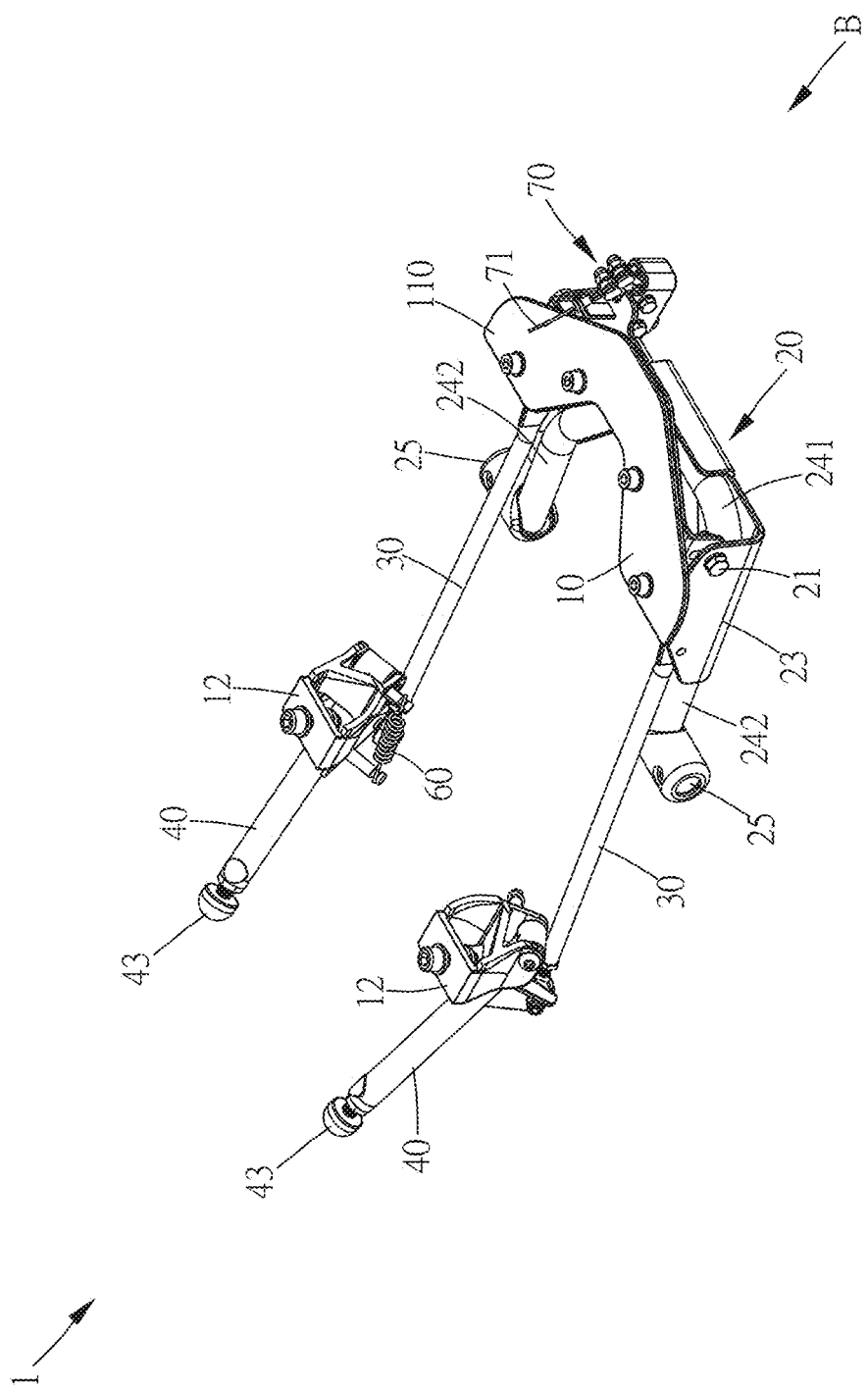
FIG. 7 is a schematic view of an embodiment of the present invention with the supporting frame in a folded state.
Figure 8:
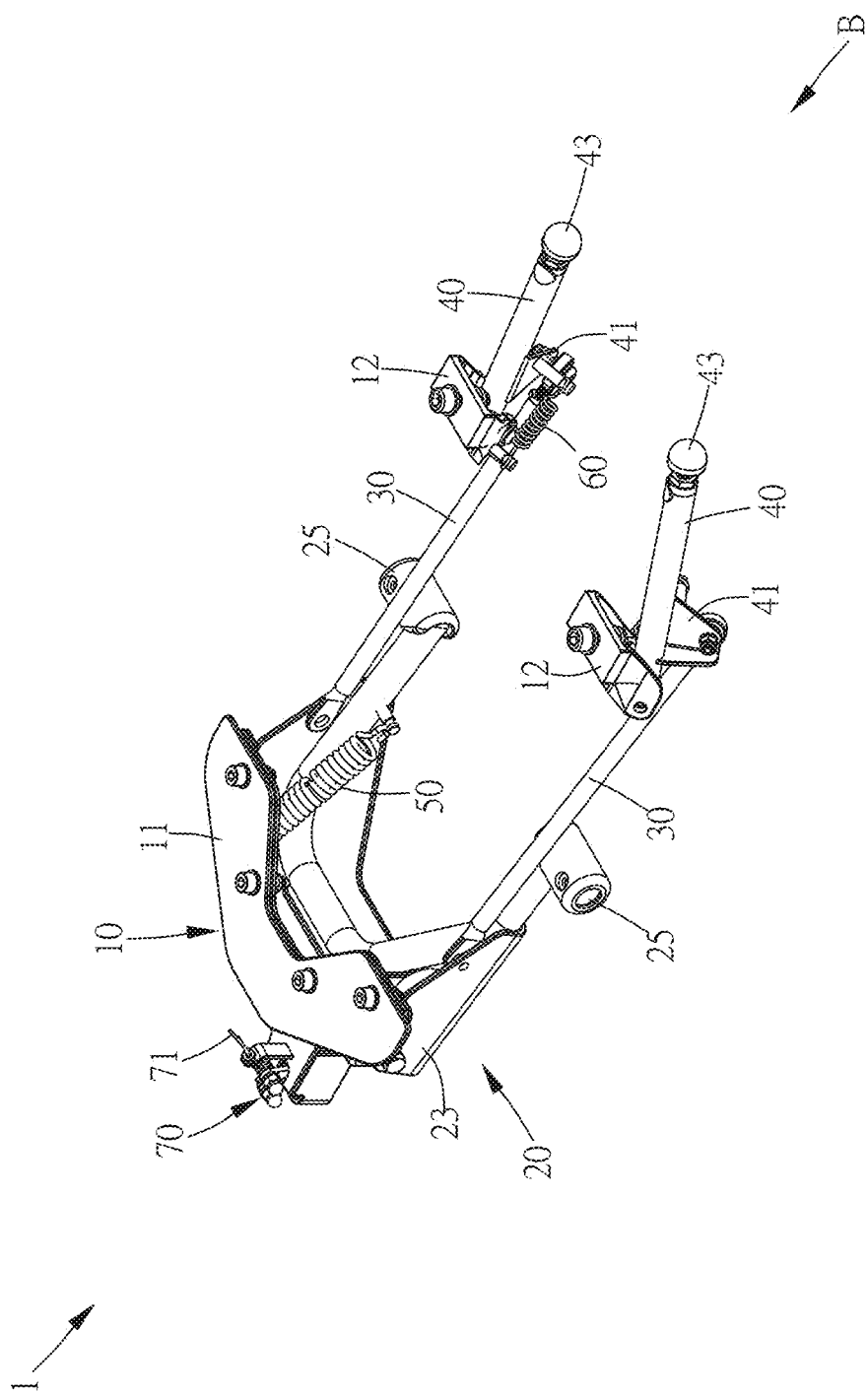
FIG. 8 is a schematic view from another angle of an embodiment of the present invention with the supporting frame in a folded state.
Figure 9:
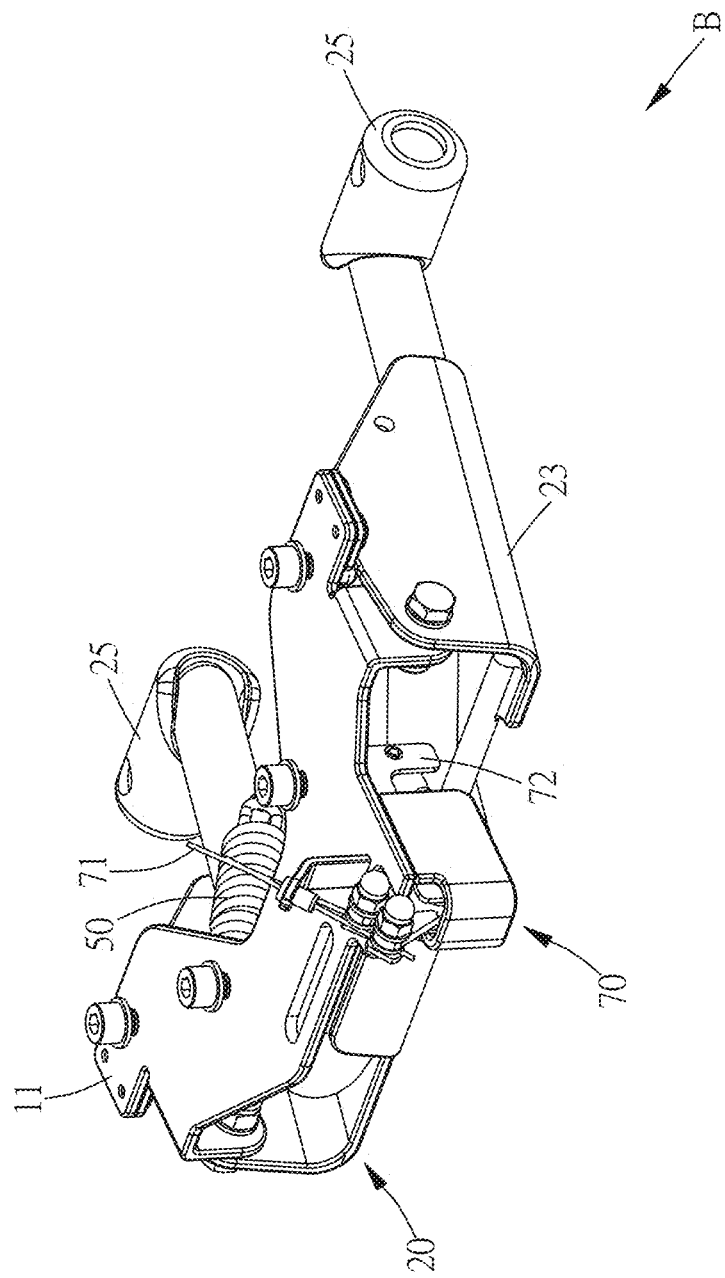
FIG. 9 is a partial schematic view of the controlling component and the front supporting frame assembly in a folded state.
Figure 10:
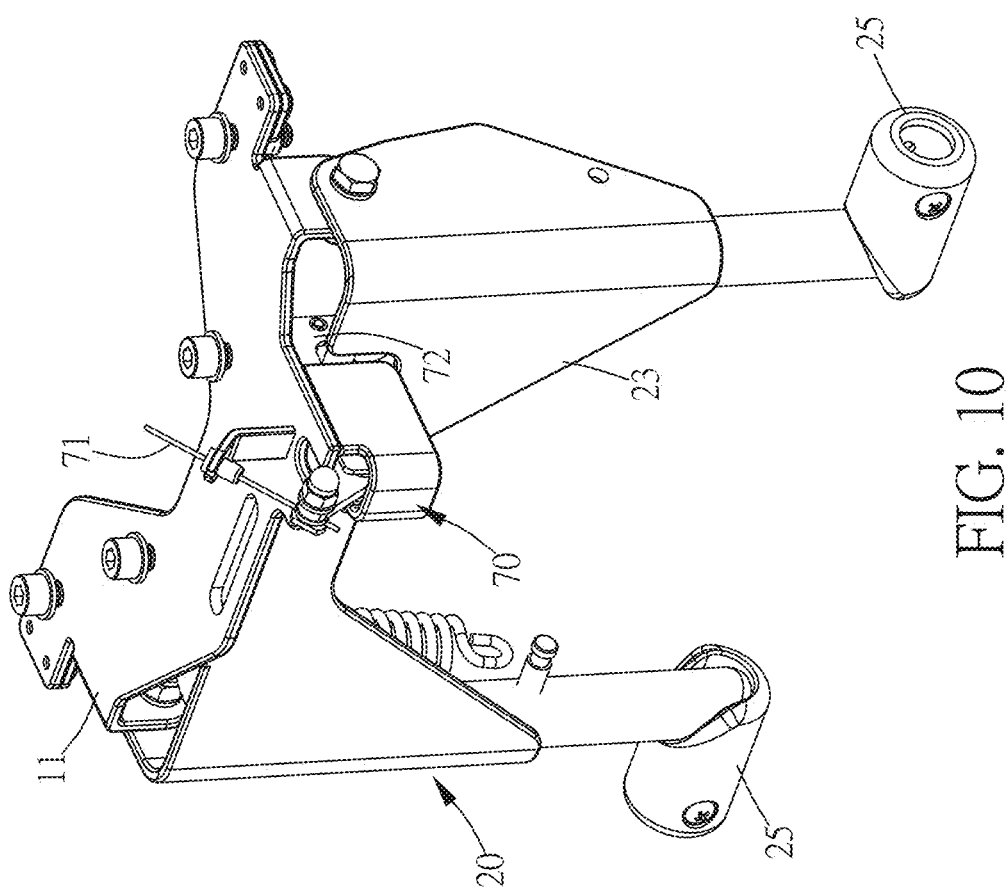
FIG. 10 is a partial schematic view of the controlling component and the front supporting frame assembly in a supporting state.

The following descriptions are with reference to FIG. 1 to FIG. 10 depicting an embodiment of the present invention of a bicycle and supporting frame thereof. FIG. 1 is a schematic view of an embodiment of the present invention of a bicycle with the supporting frame in a supporting state when the front supporting frame assembly and the front wheel stand on the ground; FIG. 1A is a schematic view of an embodiment of the present invention of a bicycle with the supporting frame in a supporting state when the front supporting frame assembly and the two rear supporting frames stand on the ground; FIG. 2 is a partial schematic view of an embodiment of the present invention of a bicycle with the supporting frame in a supporting state; FIG. 3 is a schematic view of an embodiment of the present invention of a bicycle with the supporting frame in a folded state; FIG. 4 is a schematic view of an embodiment of the present invention with the supporting frame in a supporting state; FIG. 5 is a schematic view from another angle of an embodiment of the present invention with the supporting frame in a supporting state; FIG. 6 is a side view of an embodiment of the present invention with the supporting frame in a supporting state; FIG. 7 is a schematic view of an embodiment of the present invention with the supporting frame in a folded state; FIG. 8 is a schematic view from another angle of an embodiment of the present invention with the supporting frame in a folded state; FIG. 9 is a partial schematic view of the controlling component and the front supporting frame assembly in a folded state; FIG. 10 is a partial schematic view of the controlling component and the front supporting frame assembly in a supporting state.

Referring to FIG. 1 to FIG. 3, in an embodiment of the present invention, a bicycle 100 can park stably without the risk of falling over easily. The bicycle 100 includes a rear wheel 110, a main frame 120, a handle 130 and a supporting frame 1. The rear wheel 110 is the wheel of the bicycle 100 on the rear side. The supporting frame 1 is to support the bicycle 100. The main frame 120 includes two platforms 121. The two platforms 121 are respectively and symmetrically located on the two sides of the rear wheel 110. In the present embodiment, the supporting frame 1 is located below the platform 121. However, the present invention is not limited to the present embodiment. The supporting frame 1 can be located at other positions of the main frame 120, as long as the purpose of supporting the bicycle with the supporting frame is accomplished. The handle 130 is located on the steering frame of the bicycle 100. The handle 130 is for the user to grip and steer the bicycle.

Referring to FIG. 1, FIG. 3 and FIG. 4, in an embodiment of the present invention, in relation to a bicycle 100, the supporting frame 1 has a supporting state A and a folded state B. The supporting frame 1 includes a connector 10, a front supporting frame assembly 20, two connecting bars 30, two rear supporting frames 40, at least one first elastic component 50, two second elastic components 60, a controlling component 70 and two rear supporting frame connecting portions 12. The connector 10 is located on the platform 121 of the main frame 120. The connector 10 includes a front supporting frame connecting portion 11. The front supporting frame connecting portion 11 is located on the front side of the rear wheel 110 and is connected to the bottom of the platform 121. The front supporting frame connecting portion 11 includes two pivotal connecting surfaces 111 and a bottom surface 112. The two rear supporting frame connecting portions 12 are respectively connected to the bottom of the two platforms 121, and are respectively connected to the two rear supporting frames 40.

Referring to FIG. 1, FIG. 3 to FIG. 5, in an embodiment of the present invention, when the supporting frame 1 is in a supporting state A, the front supporting frame assembly 20 is to stand on the ground together with the front wheel to support the bicycle 100 when the center of gravity of the bicycle 100 is on the front side of the bicycle 100. The front supporting frame assembly 20 is pivotally connected to the connector 10. The front supporting frame assembly 20 includes a first pivotal connecting portion 21, two second pivotal connecting portions 22, a pivotal connecting shell 23, a supporting main body 24 and two supporting components 25. The front supporting frame assembly 20 is pivotally connected to the two pivotal connecting surfaces 111 of the front supporting frame connecting portion 11 of the connector 10 through the two first pivotal connecting portions 21. The two first pivotal connecting portions 21 and the two second pivotal connecting portions 22 are both located on the pivotal connecting shell 23. In the present embodiment, the supporting main body 24 is U-shaped. The U-Shaped supporting main body 24 includes a closed end 241 (i.e., the arc-shaped tube body) and two open ends 242 (i.e., the linear tube body extending from the two ends of the arc-shaped tube body). The closed end of the U shape 241 is connected to a pivotal connecting shell 23. The two supporting components 25 are used for standing on the ground to support the supporting frame 1 when the supporting frame 1 is in a supporting state A. The two supporting components 25 are respectively located on the two open ends of the U shape 242, and the two supporting components 25 respectively extend in the direction away from the supporting main body 24.

In an embodiment of the present invention, the two connecting bars 30 is to connect the front supporting frame assembly 20 and the two rear supporting frames 40. The two connecting bars 30 both include a first connecting end 31 and a second connecting end 32 opposite the first connecting end 31. The two first connecting ends 311 are respectively and pivotally connected to the two second pivotal connecting portions 22.

Referring to FIG. 1A, FIG. 3 to FIG. 5, in an embodiment of the present invention, the two rear supporting frames 40 are two expansion poles with adjustable length. The length of each of the two rear supporting frames 40 is shorter than the length of the front supporting frame assembly 20. The two rear supporting frames 40 are used to stand on the ground to support the bicycle 100 with the front supporting frame assembly 20 when the supporting frame 1 is in a supporting state A, the rear side of the bicycle 100 is forced and the center of gravity of the bicycle 100 moving back, allowing the front wheel to be hanged. The two rear supporting frames 40 both include a third pivotal connecting portion 41, a connecting end 42 and a supporting end 43 opposite the connecting end 42. The two second connecting ends 32 are respectively and pivotally connected to the third pivotal connecting portion 41 of the two rear supporting frames 40. The two rear supporting frame connecting portions 12 are respectively connected to the connecting ends 42 of the two rear supporting frames 40. The supporting end 43 is to stand on the ground together with the two supporting components 25a to support the bicycle 100 when the supporting frame 1 is in a supporting state A. Each of the rear supporting frames 40 tilts outwardly, and an angle M is form between the rear supporting frame 40 and the normal line N of the ground.

Referring to FIG. 4 and FIG. 5, in an embodiment of the present invention, the first elastic component 50 is a spring, the two ends of the first elastic component 50 are respectively connected to the bottom surface 112 of one of the open ends 242 and the front supporting frame connecting portion 11, the first elastic component 50 is to apply an elastic force upon the front supporting frame assembly 20 and the front supporting frame connecting portion 11, to enable the front supporting frame assembly 20 to turn quickly and stably in relation to the front supporting frame connecting portion 11 and be folded. The number of first elastic component 50 can be changed to more than one as required for the design.

In an embodiment of the present invention, the two second elastic components 60 are both springs, the two ends of the two second elastic components 60 are respectively connected to the two connecting ends 41 and the two rear supporting frame connecting portions 12, to drive the two connecting ends 41 to turn in relation to the two rear supporting frame connecting portions 12. The second elastic component 60 is to apply an elastic force upon the rear supporting frame 40 and the rear supporting frame connecting portion 12, to enable the rear supporting frame connecting portion 12 to turn quickly and stably in relation to the rear supporting frame 40 and be folded.

As shown in FIG. 1, FIG. 9 and FIG. 10, in an embodiment of the present invention, the controlling component 70 is connected to the connector 10. The controlling component 70 includes at least one controlling line 71 and a locker 72. The at least one controlling line 71 is connected to the handle 130. The controlling line 71 is located with the locker 72 and a cable to operate the button. The locker 72 is located on the pivotal connecting point of the front supporting frame connecting portion 11 and the pivotal connecting shell 23. The locker 72 is a locking sheet to limit the turning of the pivotal connecting shell 23, so as to limit the pivotal connecting shell 23 to stand on the ground or be folded. For example, when the front supporting frame assembly 20 is in the supporting state A, the locker 72 will lock the pivotal connecting shell 23 to prevent the front supporting frame assembly 20 to move, such that the front supporting frame assembly 20 can be in the supporting state A stably. The operating button is located on the handle 130. The operating button is used for the user to lock or unlock the locker 72. It is noted that, as the configuration of a locker 72 and a cable to operate the button is widely adopted in the field of bicycles and is not the focus of the present invention, the structures and working principles are not detailed here.

In an embodiment of the present invention, when the user needs to park the bicycle 100, as shown in FIG. 1, FIG. 4 to FIG. 6, the user can apply a force on the front supporting frame assembly 20 (for example, by kicking the front supporting frame assembly 20), to force the supporting frame assembly 20 to turn in the direction away from the connector 10; at this time, the front supporting frame assembly 20 will push the two connecting bars 30, and the two connecting bars 30 will drive the two rear supporting frames 40 to turn along a second direction N until the front supporting frame assembly 20 and the front wheel touch the ground, resulting in a supporting state A of the supporting frame 1; thus, the four supporting frames including the two open ends 242 and the front wheel can all stand on the ground, and the bicycle 100 can be supported stably without the risk of falling over easily. The user can further operate the controlling component 70, so that the locker of the controlling component 70 can limit the turning of the first pivotal connecting portion 21, so that the first pivotal connecting portion 21 is limited to standing on the ground. This can prevent the first pivotal connecting portion 21 from turning away from the ground in case the front supporting frame assembly 20 is collided by an external force. Furthermore, if a child sits on the back seat of the bicycle 100, allowing the rear side of the bicycle 100 to be forced and the center of gravity of the bicycle 100 move back, the front wheel will be hanged, and the two rear supporting frames 40 stably stand on the ground to support the bicycle 100 with the front supporting frame assembly 20.

In an embodiment of the present invention, when the user needs to ride the bicycle 100, as shown in FIG. 3, FIG. 7 and FIG. 8, the user can firstly operate the controlling component 70 to release the locker of the controlling component 70, so that the front supporting frame assembly 20 can turn in relation to the connector 10 and be folded. Then, the user can only pushes the bicycle 100 forward slightly, to force the front supporting frame assembly 20 to turn in the direction toward the connector 10; at this time, the front supporting frame assembly 20 will push the two connecting bars 30, and the two connecting bars 30 will drive the two rear supporting frames 40 to turn along a first direction M, until the front supporting frame assembly 20 touches the connector 10, resulting in a folded state B of the supporting frame 1; thus, the two connecting bars 30 will be located above the front supporting frame assembly 20, and the two rear supporting frames 40 will be located above the two connecting bars 30. The two open ends 242 and the two rear supporting frames 40 will all be folded in relation to the two connecting bars 30 and be away from the ground. Now the user can start to ride the bicycle 100.

Further, referring to FIG. 1 and FIG. 4, when the supporting frame 1 is in a supporting state A, the front supporting frame assembly 20 stands in front of the rear wheel 110, and the two rear supporting frames 40 stand behind the axle center of the rear wheel 110; according to actual experiences of the inventor, when parked with the front supporting frame assembly 20 and the front wheel, the bicycle 100 can have a stable center of gravity and will not fall over easily. Referring to FIG. 3 and FIG. 7, when the supporting frame 1 is in a folded state B, based on the construction of the above front supporting frame assembly 20 and the two rear supporting frames 40, the folded front supporting frame assembly 20 and two rear supporting frames 40 will not protrude excessively out of the frame body of the bicycle to affect the overall size of the bicycle 100.

Based on the structural design of the present invention of a bicycle 100 and supporting frame 1 thereof, when the bicycle 100 is parked, the four supporting points of the supporting frame 1 can ensure stable parking without the risk of falling over easily. When the user needs to ride the bicycle 100 and fold the front supporting frame assembly and the two rear supporting frames, the folded front supporting frame assembly and the two rear supporting frames will not protrude excessively out of the frame body to affect the overall size of the bicycle 100. This can save the space occupied by the bicycle.

What is claimed is:

1. A supporting frame, applied on a bicycle, the bicycle comprising a main frame, said supporting frame defining a supporting state and a folded state in relation to the bicycle, and said supporting frame comprising:
    a connector, adapted to be connected to the main frame;
    a front supporting frame assembly, comprising two first pivotal connecting portions and two second pivotal connecting portions, said front supporting frame assembly pivotally connected to the connector via the two first pivotal connecting portions;
    two connecting bars, wherein said two connecting bars both comprise a first connecting end and a second connecting end opposite the first connecting end, and the two first connecting ends are respectively and pivotally connected to the two second pivotal connecting portions; and
    two rear supporting frames, wherein said two rear supporting frames both comprise a third pivotal connecting portion, and the two second connecting ends respectively and pivotally connected to the third pivotal connecting portions of the two rear supporting frames;
    when the front supporting frame assembly is turned in a direction toward the connector, the front supporting frame assembly pushes the two connecting bars, so that the two connecting bars drive the two rear supporting frames to turn along a first direction until the front supporting frame assembly touches the connector, resulting in the folded state of the supporting frame;
    when the supporting frame assembly turns in a direction away from the connector, the front supporting frame assembly will push the two connecting bars, so that the two connecting bars will drive the two rear supporting frames to turn along a second direction until the front supporting frame assembly touches a ground, resulting in the supporting state of the supporting frame.

2. The supporting frame as claimed in claim 1, wherein when the supporting frame is in the folded state, the two connecting bars are located above the front supporting frame assembly, and the two rear supporting frames are located above the two connecting bars.

3. The supporting frame as claimed in claim 2, further comprises two rear supporting frame connecting portions, wherein the two rear supporting frames both comprise a connecting end and a supporting end opposite the connecting end, wherein the two rear supporting frame connecting portions are respectively connected to the connecting end of the two rear supporting frames.

4. The supporting frame as claimed in claim 3, which further comprises two second elastic components, and wherein two ends of the two second elastic components are respectively connected to the two connecting ends and the two rear supporting frame connecting portions, so as to drive the two rear supporting frames to turn in relation to the two rear supporting frame connecting portions.

5. The supporting frame as claimed in claim 1, wherein the front supporting frame assembly further comprises a pivotal connecting shell, and the two first pivotal connecting portions and the two second pivotal connecting portions are both located on the pivotal connecting shell.

6. The supporting frame as claimed in claim 5, wherein the connector further comprises a front supporting frame connecting portion, said front supporting frame connecting portion comprises two pivotal connecting surfaces, wherein the two first pivotal connecting portions are respectively and pivotally connected to the two pivotal connecting surfaces.

7. The supporting frame as claimed in claim 5, wherein the front supporting frame assembly further comprises a supporting main body and two supporting components; said supporting main body is U-shaped, and a closed end of U shape is connected to a pivotal connecting shell; the two supporting components are respectively located on two open ends of U shape, and the two supporting components respectively extend in a direction away from the supporting main body.

8. The supporting frame as claimed in claim 7, which further comprises at least one first elastic component, the connector further comprises a front supporting frame connecting portion, said front supporting frame connecting portion further comprises a bottom surface; at least one of the two ends of the first elastic component is respectively connected to one of the two open ends and the bottom surface, so as to drive the front supporting frame assembly to turn in relation to the front supporting frame connecting portion.

9. The supporting frame as claimed in claim 1, wherein the bicycle further comprises a rear wheel, the main frame further comprises two platforms, the two platforms are respectively adapted to be connected to two sides of the rear wheel, and the connector is connected to the two platforms.

10. The supporting frame as claimed in claim 1, wherein the bicycle further comprises a rear wheel; when the supporting frame is in the supporting state, the front supporting frame assembly is adapted to stand in front of the rear wheel, whereas the two rear supporting frames are adapted to stand behind an axle center of the rear wheel.

11. In combination, a bicycle and a supporting frame, comprising:
the bicycle;
a main frame; and
the supporting frame defining a supporting state and a folded state in relation to the bicycle, said supporting frame comprising:
a connector, located on the main frame;
a front supporting frame assembly, comprising two first pivotal connecting portions and two second pivotal connecting portions, said front supporting frame assembly pivotally connected to the connector via the two first pivotal connecting portions;
two connecting bars, said two connecting bars both comprising a first connecting end and a second connecting end opposite the first connecting end, wherein the two first connecting ends are pivotally connected to the two second pivotal connecting portions; and
two rear supporting frames, said two rear supporting frames both comprising a third pivotal connecting portion, the two second connecting ends respectively and pivotally connected to the third pivotal connecting portions of the two rear supporting frames;
when the front supporting frame assembly is turned in a direction toward the connector, the front supporting frame assembly pushes the two connecting bars, so that the two connecting bars drive the two rear supporting frames to turn along a first direction until the front supporting frame assembly touches the connector, resulting in the folded state of the supporting frame; when the supporting frame assembly turns in a direction away from the connector, the front supporting frame assembly will push the two connecting bars, so that the two connecting bars will drive the two rear supporting frames to turn along a second direction until the front supporting frame assembly touches a ground, resulting in the supporting state of the supporting frame.

12. The combination as claimed in claim 11, wherein, when the supporting frame is in the folded state, the two connecting bars are located above the front supporting frame assembly, and the two rear supporting frames are located above the two connecting bars.

13. The combination as claimed in claim 12, wherein the supporting frame further comprises two rear supporting frame connecting portions, said two rear supporting frames both comprise a connecting end and a supporting end opposite the connecting end, wherein the two rear supporting frame connecting portions are respectively connected to the connecting ends of the two rear supporting frames.

14. The combination as claimed in claim 13, wherein said supporting frame further comprises two second elastic components, two ends of the two second elastic components are respectively connected to the two connecting ends and the two rear supporting frame connecting portions, so as to drive the two rear supporting frames to turn in relation to the two rear supporting frame connecting portions.

15. The combination as claimed in claim 11, wherein the front supporting frame assembly further comprises a pivotal connecting shell, and the two first pivotal connecting portions and the two second pivotal connecting portions are both located on a pivotal connecting shell.

16. The combination as claimed in claim 15, wherein the connector further comprises a front supporting frame connecting portion, and the front supporting frame connecting portion comprises two pivotal connecting surfaces, wherein the two first pivotal connecting portions are respectively and pivotally connected to the two pivotal connecting surfaces.

17. The combination as claimed in claim 15, wherein said front supporting frame assembly further comprises a supporting main body and two supporting components; said supporting main body is U-shaped, and a closed end of U shape is connected to a pivotal connecting shell; said two supporting components are respectively located on two open ends of U shape, and the two supporting components respectively extend in the direction away from the supporting main body.

18. The combination as claimed in claim 17, wherein said supporting frame further comprises at least one first elastic component, the connector further comprises a front supporting frame connecting portion, said front supporting frame connecting portion comprises a bottom surface; at least one of the two ends of the first elastic component areis respectively connected to one of the two open ends and the bottom surface, so as to drive the front supporting frame assembly to turn in relation to the front supporting frame connecting portion.

19. The combination as claimed in claim 11, wherein the bicycle further comprises a rear wheel, and wherein, the main frame further comprises two platforms, the two platforms are respectively located on two sides of the rear wheel, and the connector is connected to the two platforms.

20. The combination as claimed in claim 11, wherein the bicycle further comprises a rear wheel; when the supporting frame is in the supporting state, the front supporting frame assembly stands in front of the rear wheel, and the two rear supporting frames stand behind an axle center of the rear wheel.

* * * * *